United States Patent

Dadel et al.

[11] Patent Number: 5,351,795
[45] Date of Patent: Oct. 4, 1994

[54] ELECTRONICALLY CONTROLLED HYDRODYNAMIC RETARDER WITH ADAPTIVE DUTY CYCLES BASED ON DECELARATIONS

[75] Inventors: Martin R. Dadel, Plainfield; Bradley L. McCafferty; Phillip F. McCauley, both of Zionsville, all of Ind.

[73] Assignee: General Motors Corporation, Detroit, Mich.

[21] Appl. No.: 938,103

[22] Filed: Aug. 31, 1992

[51] Int. Cl.⁵ .......................... B60K 31/00; B60T 8/26
[52] U.S. Cl. ...................................... 477/96; 192/4 B; 364/426.01; 477/187; 477/196
[58] Field of Search .................. 192/4 B, 1.21, 12 A; 74/856; 364/426.01, 426.04; 188/290

[56] References Cited

U.S. PATENT DOCUMENTS

| | | | |
|---|---|---|---|
| 4,235,320 | 11/1980 | Polak et al. | 192/4 B |
| 4,257,504 | 3/1981 | Hanke | 192/12 A |
| 4,440,272 | 4/1984 | Bieber | 192/4 B X |
| 4,550,372 | 10/1985 | Kahrs | 364/426.01 |
| 4,630,507 | 12/1986 | Kugler et al. | 192/4 B X |
| 4,699,022 | 10/1987 | Stadt et al. | 192/4 B X |
| 4,711,328 | 12/1987 | Bazilio et al. | 188/296 |
| 4,768,401 | 9/1988 | Fuehrer et al. | 74/846 |
| 4,805,104 | 2/1989 | Kishimoto et al. | 364/426.01 |
| 4,836,341 | 6/1989 | Hall, III | 192/4 B X |
| 4,867,288 | 9/1989 | Simonyi et al. | 192/4 B X |
| 4,884,669 | 12/1989 | Ehrlinger | 192/4 B |
| 5,107,725 | 4/1992 | Takahashi | 192/4 B X |
| 5,163,742 | 11/1992 | Töpfer et al. | 364/426.01 X |
| 5,187,433 | 2/1993 | Even | 364/426.01 X |

FOREIGN PATENT DOCUMENTS

| | | | |
|---|---|---|---|
| 51965 | 5/1982 | European Pat. Off. | 364/426.01 |
| 2080458 | 2/1982 | United Kingdom | 364/426.01 |

Primary Examiner—Dirk Wright
Assistant Examiner—Khoi Q. Ta
Attorney, Agent, or Firm—Donald F. Scherer

[57] ABSTRACT

An electronically controlled hydrodynamic retarder interconnects with the output shaft of a vehicle transmission to selectively apply a braking torque thereto. The retarder includes a solenoid valve, the operating duty cycle of which controls the retarder capacity and resultant braking torque. A control unit, interconnecting the transmission and the retarder, regulates the duty cycle of the solenoid valve to regulate the retarder operation as a function of excessive deceleration or overheating, while also regulating such operation during downshift to assure efficient, effective, and comfortable operation of the transmission/retarder. The retarder is adaptive to accommodate variations resulting from age, wear, and the like.

5 Claims, 4 Drawing Sheets

ELECTRONICALLY CONTROLLED
HYDRODYNAMIC RETARDER WITH ADAPTIVE
DUTY CYCLES BASED ON DECELARATIONS

TECHNICAL FIELD

The invention herein resides in the art of transmission devices and, more particularly, to retarders for vehicle transmissions. Specifically, the invention pertains to an electronically controlled hydrodynamic retarder for a vehicle transmission.

BACKGROUND ART

The use of hydrodynamic retarders as a means for applying braking torque to a vehicle transmission is well known. Typically, such retarders employ a rotary member connected to the hub of a transmission output shaft which is operative to circulate fluid between vane members on a stationary housing. The fluid circulation results in power absorption and retardation of the output shaft of the transmission. A reduction in vehicle speed typically results from such action, assuming that the roadway or other supportive surface of the vehicle demonstrates a frictional coefficient sufficient to support such braking torque.

It is generally known to employ a solenoid valve in hydrodynamic retarders to function as a pressure control valve under pulse width modulation as controlled by an appropriate transmission control unit such as a dedicated microprocessor or the like. The duty cycle at which the solenoid valve is actuated regulates the retarder capacity or the load applied to the output shaft of the transmission and, accordingly, controls the braking activity achieved by the retarder. Retarders of the known type and their associated control systems are shown, by way of example, in U.S. Pat. Nos. 4,768,401, 4,836,341, 4,711,328, 4,257,504, and 4,235,320. The mechanical structure of the previously known retarders are typically adaptable for implementation in accordance with the instant invention, but for a modification to the control valve spool which will be discussed below.

It has generally been known that the prior art retarders have operated in an open loop mode, not employing real time adjustments for feed back control to compensate for system variations to maximize retarder efficiency. The prior art retarders have not been adaptive to accommodate the effects of aging on system operations, responsiveness, and repeatability. Additionally, the previously known retarders have not been responsive to excessive vehicle deceleration rates to modify the retarding activity, nor have they been responsive to excessive heat buildup in the retarder/transmission to modify, alter, or suspend the retarding activity. Prior art retarders have also been known to aggravate transmission downshifting by adding excessive braking torque during the shifting operation, the same being inconsistent with smooth transmission operation during downshifting as required for passenger comfort.

Additionally, the previously known retarders have generally interfered with the transmission operation during a downshift when the retarder is concurrently seeking to achieve increased activity. In such situations, where both the transmission and the retarder are demanding increased volumes of transmission oil, any insufficiency in oil to satisfy both needs has resulted in ineffective and inefficient operation of both the transmission and the retarder. Previous attempts to circumvent such a problem have typically required the implementation of oversized oil pumps and reservoirs to assure sufficient oil volume to satisfy the needs of both, the same adding to the complexity and cost of the transmission system.

There is a need in the art for an electronically controlled hydrodynamic retarder for use with a vehicle transmission which overcomes the shortcomings of the prior art noted above.

DISCLOSURE OF INVENTION

In light of the foregoing, it is a first aspect of the invention to provide an electronically controlled hydrodynamic retarder which is adaptive to compensate for varying parameters of the associated transmission, including age, vehicle characteristics, roadway changes, and the like.

Another aspect of the invention is the provision of an electronically controlled hydrodynamic retarder which accommodates excessive deceleration rates of the vehicle.

Another aspect of the invention is the provision of an electronically controlled hydrodynamic retarder which accommodates excessive overheating of the transmission system.

Still a further aspect of the invention is the provision of an electronically controlled hydrodynamic retarder which accommodates smooth downshifting with minimal interruption of retarder activity.

Yet an additional aspect of the invention is the provision of an electronically controlled hydrodynamic retarder which accommodates downshifting of the transmission with increased retarder activity.

The foregoing and other aspects of the invention which will become apparent herein are achieved by a vehicle transmission system, comprising: a transmission having a power output shaft; a retarder interconnected with said output shaft for selectively applying a braking torque thereto; and control means interconnected between said transmission and said retarder for regulating said retarder and said braking torque, said control means sensing vehicle speed and transmission temperature and regulating said retarder and braking torque as a function thereof.

Other aspects of the invention which will become apparent herein are achieved by a vehicle transmission system, comprising: a transmission having a power output shaft; a retarder interconnected with said output shaft for selectively applying a braking torque thereto; and control means interconnected between said transmission and said retarder for regulating said retarder and said braking torque, said control means reducing said braking torque and inhibiting any request of said retarder for increased braking torque during a downshift of said transmission.

Yet additional aspects of the invention which will become apparent herein are attained by a vehicle transmission system, comprising: a transmission having a power output shaft; a retarder having a spring-biased solenoid valve and being interconnected with said output shaft for selectively applying a braking torque thereto; and control means interconnected between said transmission and said retarder for regulating said retarder by pulse width modulating said solenoid valve at selected duty cycles, said control means activating said retarder at known transmission speeds at predetermined duty cycles and monitoring resultant vehicle deceleration at such transmission speeds and duty cycles, said control means extrapolating therefrom an adaptive relationship between duty cycle and retarder braking torque.

DESCRIPTION OF DRAWINGS

For a complete understanding of the objects, techniques, and structure of the invention reference should be made to the following detailed description and accompanying drawings wherein.

BEST MODE FOR CARRYING OUT THE INVENTION

Figure 1:
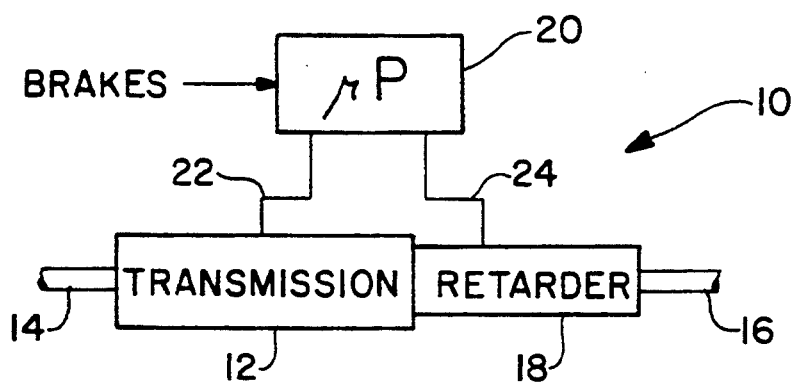
FIG. 1 is an illustrative block diagram of a transmission and retarder system according to the invention.

Referring now to the drawings and more particularly FIG. 1, it can be seen that the vehicle transmission and retarder system according to the invention is designated generally by the numeral 10. As a part of the system 10, a transmission 12 is provided with an input shaft 14 and an output shaft 16, with the transmission 12 comprising a plurality of gear sets to accommodate various power transmission ratios from the power input on the shaft 14 to the power output on the shaft 16.

A hydrodynamic retarder 18 is interconnected with the output shaft 16 to provide a braking function to the vehicle in somewhat standard fashion. A control unit 20, such as a dedicated microprocessor or the like, is interconnected with the transmission 12 and retarder 18 by respective data and control buses 22, 24. It will be appreciated that the control unit 20 receives, for example, data respecting the temperature of the transmission and retarder oil, and instantaneous vehicle speed from the buses 22, 24, along with other data respecting desired vehicle parameters and transmission operation. The control unit 20 controls the shifting of the transmission 12 through the control lines of the bus 22 and, as will become apparent below, controls the duty cycle and other operations of the retarder 18 over the control lines of the bus 24. Those skilled in the art will, of course, readily appreciate that the instantaneous speed signal derived from the transmission 12 may be readily differentiated to develop a deceleration/acceleration signal respecting the vehicle in general.

Figure 2:
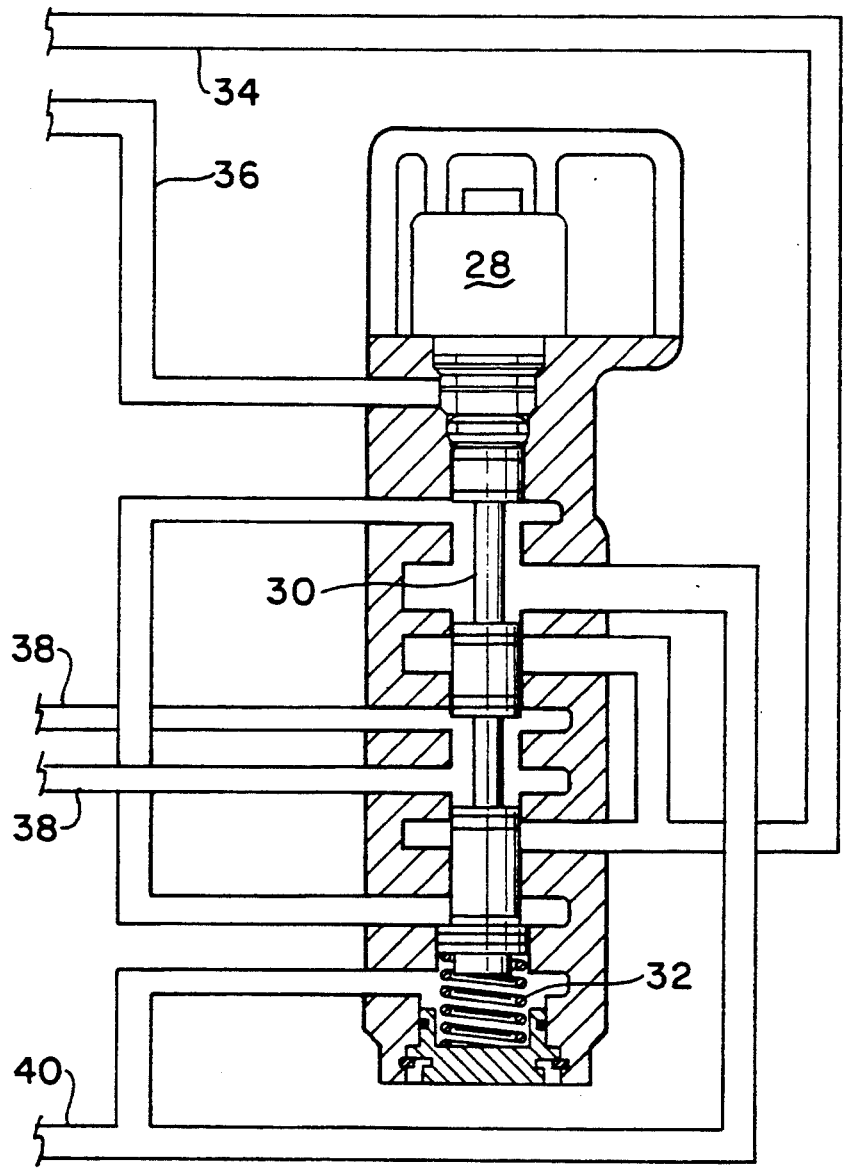
FIG. 2 is a schematic diagram of the regulating valve assembly of the retarder of the invention.

The retarder 18 may typically be as generally known in the art, with the regulating valve thereof being modified as shown in FIG. 2. The regulating valve assembly 26 of the retarder 18 includes a pulse width modulated solenoid 28 which is connected to and controlled by the control unit 20 and which is operative to drive the spool 30 against the biasing of the spring 32. Those skilled in the art will understand that the spool 30 moves at the duty cycle under which the solenoid 28 is operated as regulated by the control unit 20. This duty cycle controls the amount of transmission fluid passing through the conduit of the regulating valve assembly 26 and to the retarder, thereby controlling the amount of braking torque generated thereby.

As shown in FIG. 2, the spool 30 is operative among the main pressure conduit 34, control main conduit 36, exhaust conduits 38, and retarder conduit 40 to achieve the desired pulse width modulated control of hydraulic pressure to the retarder 18. It will be appreciated that the retarder 18 is connected to the retarder conduit 40 and receives the differential pressure generated between the main pressure conduit 34 and the exhaust conduit 38, the same being regulated as a function of the applied duty cycle. While in the prior art the valve spool or piston 30 has been a 1:1 ratio valve, in the instant invention the ratio is changed to preferably 1.7:1 such that the spool 30, in combination with the biasing spring 32, allows for achievement of the adaptive feature of the invention which will be discussed below. Those skilled in the art will understand that the differential area on the regulating valve provides a feature which allows for the operation of the retarder 18 at a known maximum pressure in a specified speed range when the solenoid 28 is operated at 100 percent duty cycle (full on). The biasing spring 32 assures a repeatable reference pressure at a full 100 percent duty cycle such that predictions can then be made from that reference signal as to the amount of retarder activity that could be achieved at lower operating pressures as regulated at lesser duty cycles. Such a feature allows the retarder 18 to be adaptive, with periodic adjustments being made through the control unit 20 to compensate for wear and the like.

Figure 3:
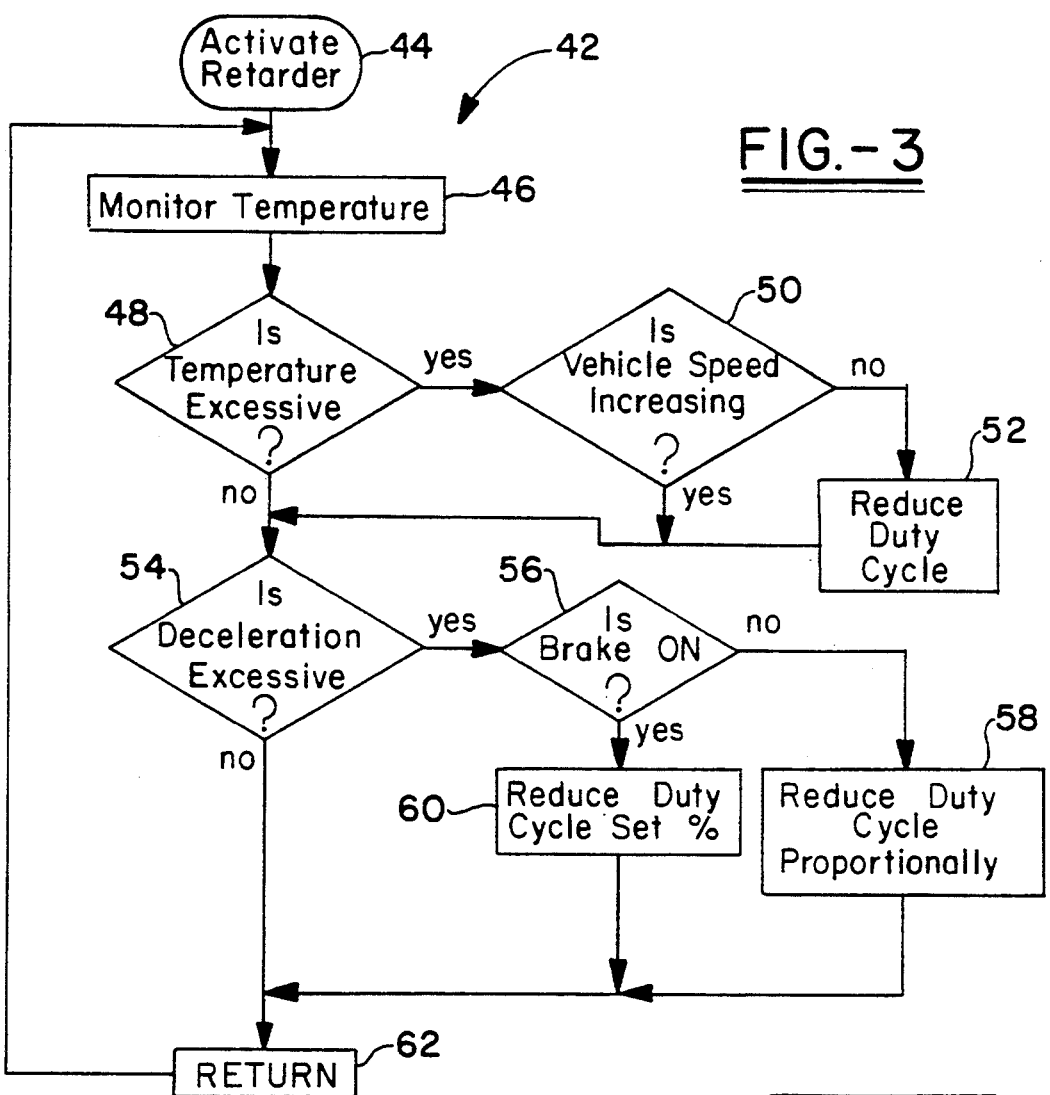
FIG. 3 is a flow chart of the algorithm for retarder control as a function of vehicle deceleration and transmission temperature according to the invention.

As mentioned above, prior art retarders have typically operated in an open loop mode, without the benefit of real time adjustments as achieved from a closed loop control system. According to the instant invention, the control unit 20, receiving speed, deceleration, and temperature signals from the transmission 12 and retarder 18, is operative to regulate the capacity of the retarder 18 through regulation of the duty cycle of the regulating valve assembly 26 to optimize the efficiency and effectiveness of the operation of the retarder. As shown in FIG. 3, an algorithm for retarder control as a function of vehicle deceleration and transmission oil temperature is designated generally by the numeral 42. With the retarder activated at 44, a monitoring of temperature of the transmission oil is undertaken at 46. If the temperature of the oil is found to exceed a particular level as at 48, a determination is made at 50 as to whether the vehicle speed is increasing. If the vehicle speed is increasing, suggesting a "runaway" vehicle or the like, no modification or reduction in the retarder duty cycle is undertaken, assuring that maximum retarder activity is available to correct the runaway situation. However, if the vehicle speed is not increasing, the duty cycle of the control signal to the solenoid valve 28 is reduced as at 52, reducing the capacity of the retarder 18. The reduction in duty cycle is typically inversely proportional to the excessive heat noted in the transmission and may either be effected as a continuous function of such temperature excess, or as a step function decrease, as desired.

After the adjustment for temperature has been undertaken as discussed directly above, a determination is made at 54 as to whether the deceleration of the vehicle exceeds a desired level. If it does, a determination is made as to whether the brakes of the vehicle have been applied. Where actual braking activity of the vehicle wheels is being undertaken by the operator, the duty cycle applied to the solenoid valve 28 is reduced by a set predetermined percentage as at 60. In the event that the operator has not applied the brakes to the vehicle wheels, a determination is made at 58 to reduce the duty cycle applied to the solenoid valve 28 proportionally to the amount of excessive deceleration being experienced. Such proportionate reduction will tend to smoothly bring the deceleration rate into acceptable limits, it being understood that the only braking torque on the vehicle in such a situation is the torque of the retarder.

After the temperature and deceleration adjustments have been made as just discussed, a return is made at 62 to begin the monitoring and adjustment anew.

Figure 4:
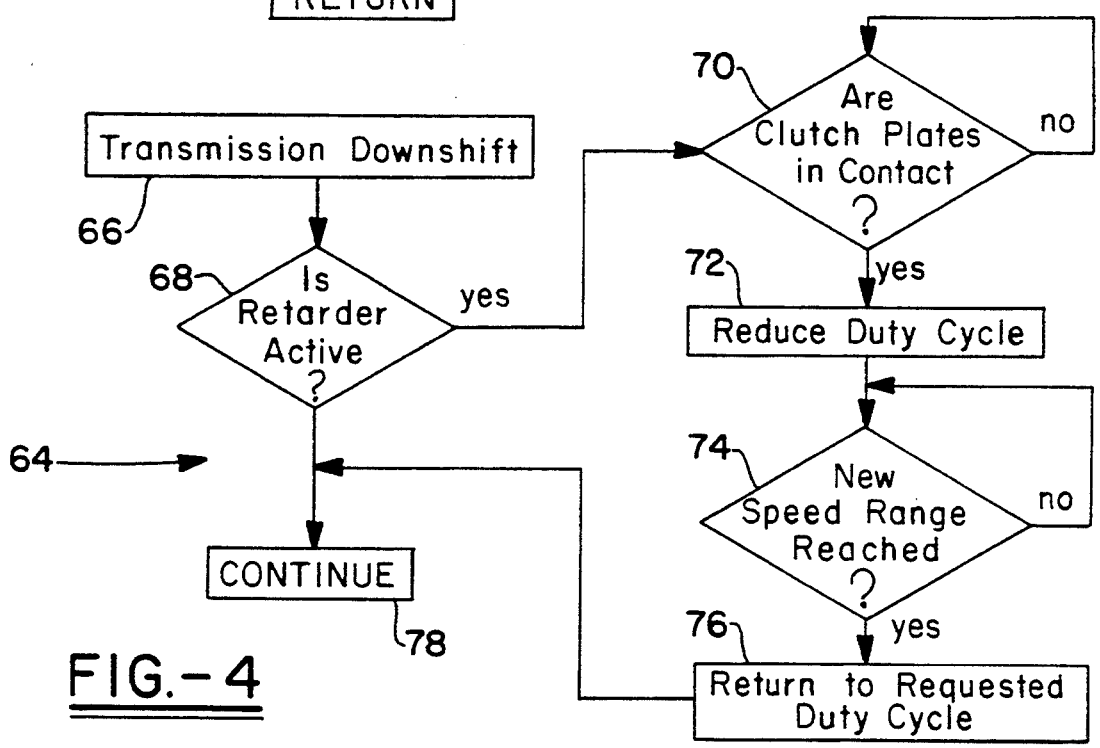
FIG. 4 is a flow chart of the algorithm for retarder control for smooth downshifts according to the invention.

With reference now to FIG. 4, it can be seen that the control unit 20 is also adapted to control the retarder 18 to assure smooth downshifts during retarder activity. The requisite algorithm 64 is shown in FIG. 4. Those skilled in the art will appreciate that when a transmission downshift takes place concurrent with retarder activity, the total effective braking torque on the output shaft 16 may be excessive for passenger comfort and smooth transmission operation. Accordingly, it is desirable to reduce the retarder activity during a downshift operation until the shift is complete. To that end, the algorithm 64 provides that when a transmission downshift occurs as at 66 and a determination is made as at 68 that the retarder is active, a reduction in retarder activity is engaged. A determination is made as at 70 whether the clutch plates of the transmission are in contact. When they contact, the duty cycle applied from the control unit 20 to the solenoid 28 is reduced as at 72. The reduction in duty cycle decreases the capacity of the retarder 18 such that the braking torque applied to the output shaft 16 is correspondingly reduced. Such reduction continues until a determination is made at 74 that the new transmission speed range has been reached. When that determination is made, indicating that the shift is complete, a return is made at 76 to the requested duty cycle for the solenoid valve 28, such that the requested operation of the retarder can be experienced. The system then continues as at 78. It should thus be apparent that smooth downshifts may be achieved concurrently with retarder activity.

Figure 5:
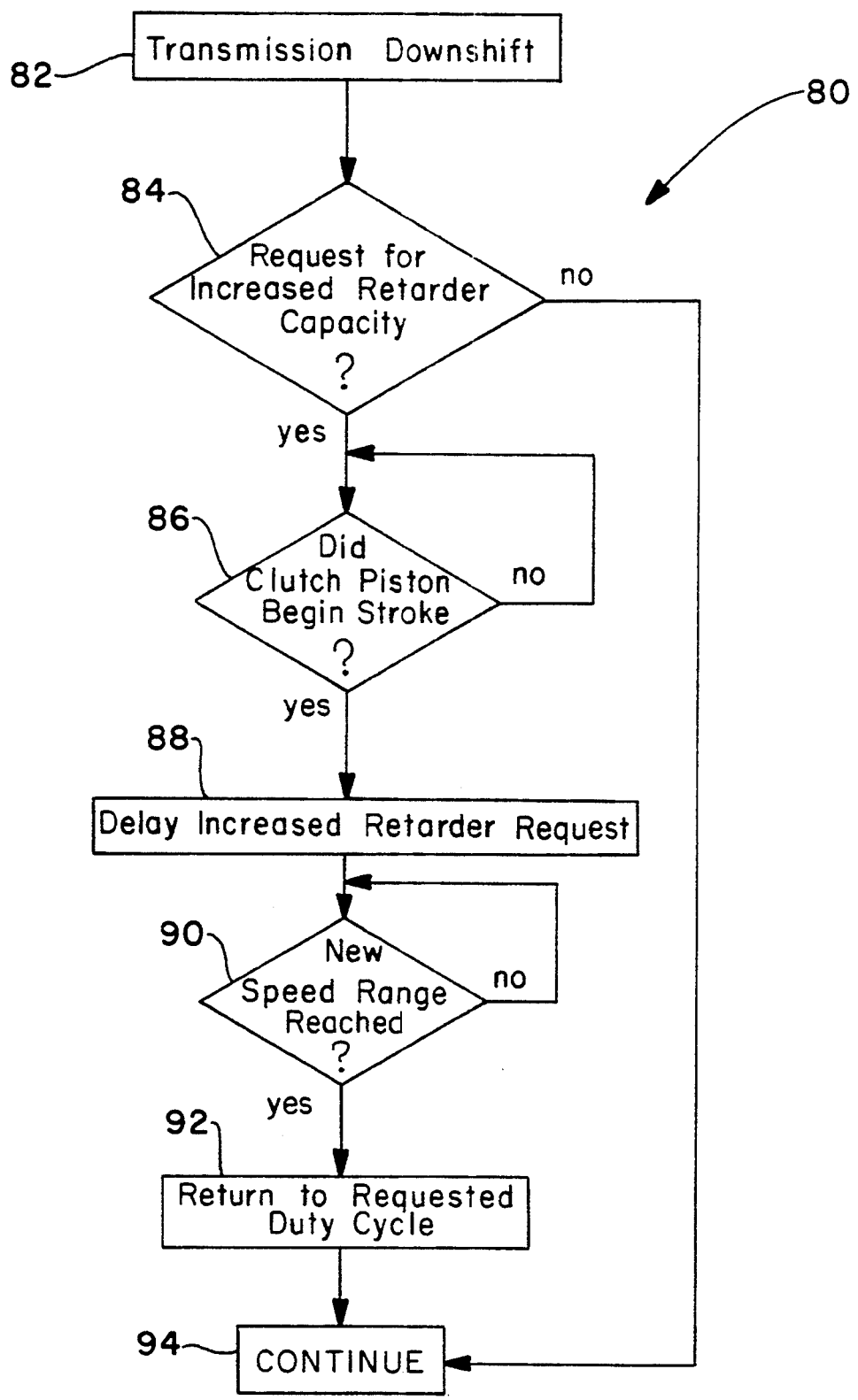
FIG. 5 is a flow chart of the algorithm for retarder control accommodating increasing retarder application during a downshift according to the invention.

Other problems arise when a downshift of the transmission occurs at the same time as a request for increased retarder capacity. Both actions make demands for increased oil volume. In the absence of sufficient oil volume, erratic and transient torques may be experienced in the transmission or retarder. To overcome these problems, it has previously been thought necessary to significantly increase the transmission oil reservoir and/or pump capabilities. However, the instant invention, by unique retarder control, eliminates the problem without the necessity of increased cost or complexity. The algorithm for such control is designated by the numeral 80 in FIG. 5.

When a transmission downshift is requested as at 82 and a request for increased retarder capacity is concurrently requested as at 84, the control unit 20 regulates the duty cycle of the solenoid valve 28 to delay the increased retarder request for a sufficient time to assure that the shift has been completed. As shown at 86, when the clutch piston begins its stroke, the request for increased retarder capacity is delayed as at 88. This delay may be achieved by simply maintaining the status of the duty cycle applied to the solenoid valve 28 at the duty cycle being experienced at the time the downshift was commenced. Once the transmission has reached its new speed range as at 90, the control unit 20 determines that the downshift has been completed and, at 92, returns to increasing the duty cycle of the solenoid valve 28 to reach the requested duty cycle. The control unit 20 then continues in its normal course of operation as at 94. Of course, if the determination is made at 84 that no request for increased retarder capacity was made concurrently with transmission downshift, the delay just described is not employed.

Figure 6:
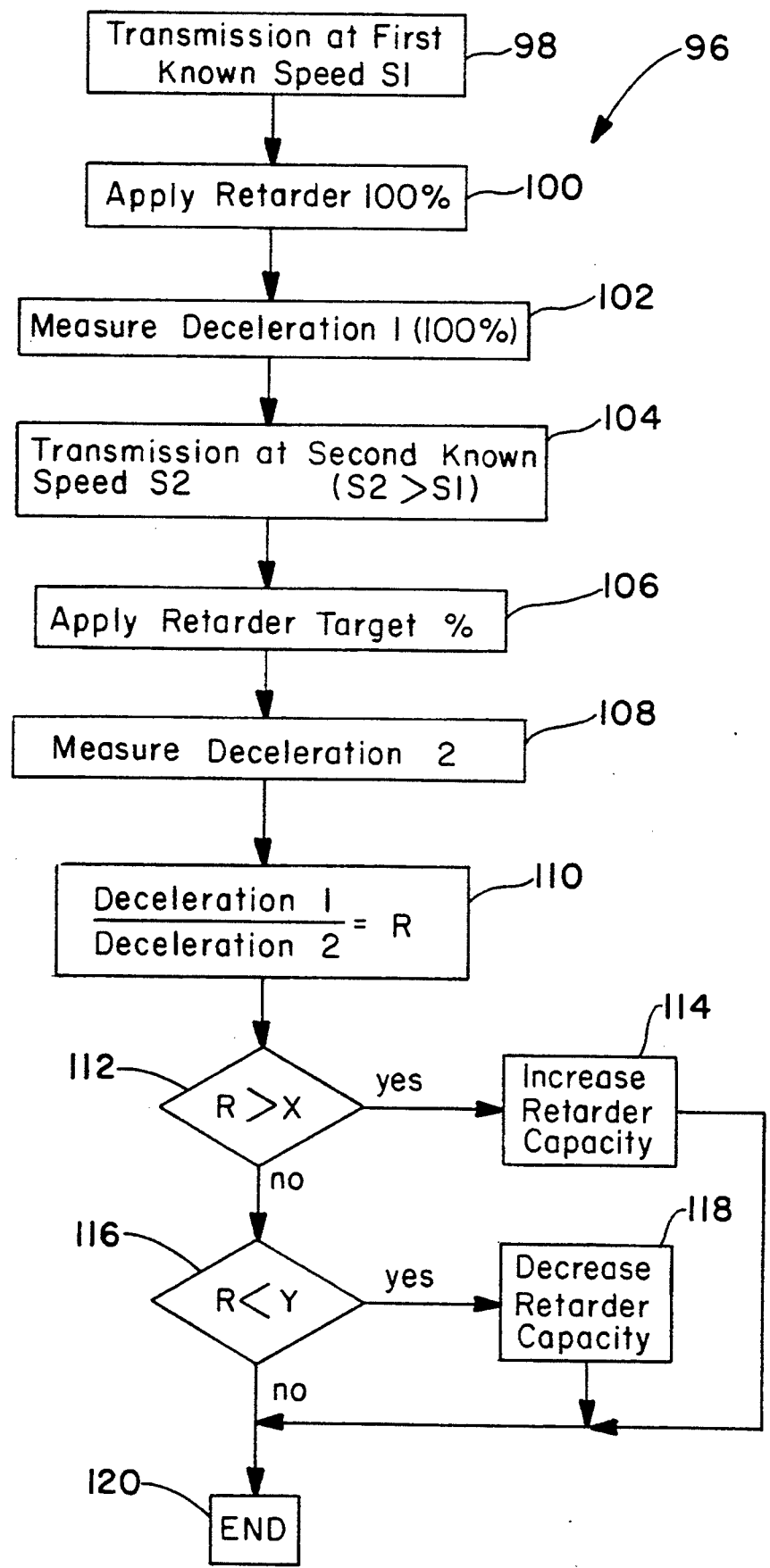
FIG. 6 is a flow chart of the algorithm for the retarder adaptive feature according to the invention.

As presented above, the adaptive feature of the retarder 18 is an important feature of the instant invention. That adaptive feature is accommodated by the implementation of the regulating valve assembly as shown in FIG. 2 and described above. The adaptive nature of the retarder allows the retarder to compensate for age and wear such that the operation of the retarder is reliable and repeatable. By utilizing the adaptive feature, the real time control of the retarder through regulation of the duty cycle of the regulating valve assembly 26 will require less adjustment or "hunting" during the regulation of the control duty cycle than if no adaptive feature were present. The algorithm for the adaptive feature is designated by the numeral 96 and shown in FIG. 6.

As illustrated, when the speed of the transmission reaches a first known speed S1 as at 98, the retarder 18 is applied at 100 percent capacity as at 100. It will be appreciated that as the retarder 18 is operated at 100 percent duty cycle, the solenoid valve 28 urges the spool 30 full open against the biasing of the spring 32. At this point, the deceleration rate of the transmission is measured as at 102 and designated as Deceleration 1 as at 102. With this value measured and stored, when the transmission reaches a second known speed S2 as at 104, where S2 is greater than S1, the retarder is again applied as at 106. However, the application of the retarder 18 at the higher speed S2 is at a lesser target duty cycle than the 100 percent (full on) duty cycle at which the retarder was applied at the speed S1. During this application, a measurement is made at 108 of the deceleration rate of the transmission, designated Deceleration 2. Next, a ratio R is determined at 110 establishing the relationship between Deceleration 1 and Deceleration 2.

With the ratio R having been calculated, determinations are made as to the relationship of the ratio with known values, such relationship determining the need for adjustment of the retarder capacity to compensate for age, wear, and the like. At 112, a determination is made as to whether the ratio R is greater than a first fixed value X. If the ratio exceeds the value X, then the retarder capacity is increased as at 114. If, however, the ratio is less than X, then a determination is made at 116 as to whether the ratio R is less than a second set value Y, where Y is less than X. If the ratio R is less than Y, as determined at 116, then the retarder capacity is decreased by a set amount as at 118. The adaptive operation then terminates as at 120.

It should be appreciated that, with the adaptive feature just discussed having been undertaken, and with the control unit 20 having correlated the adjustment necessary from a 100 percent duty cycle to a lesser target percent duty cycle, the control unit 20 may extrapolate the adjustment necessary for achieving other desired retarder levels which might be selected by the operator. Accordingly, if a desired deceleration rate is requested by the operator, the retarder 18 will, under direction of the control unit 20, approach the deceleration level in a reliable and repeatable manner. Real time changes and modifications in the duty cycle applied to the solenoid valve will necessarily be reduced.

Those skilled in the art will further understand that the process 96 may be undertaken for various transmission speeds to develop an extended data base for more accurate extrapolation. The adaptive feature of the invention may thus be further enhanced.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

We claim:

1. A vehicle transmission system, comprising:
    a transmission having a power output shaft;
    a retarder interconnected with said output shaft for selectively applying a braking torque thereto; and
    control means interconnected between said transmission and said retarder for regulating said retarder to control said braking torque, said control means (a) sensing vehicle speed and transmission temperature and regulating said retarder to control said braking torque as a function thereof, (b) reducing said braking torque by control of said retarder when said transmission temperature exceeds a particular level and said vehicle speed is not increasing, and (c) reducing said braking torque a proportional amount by control of said retarder when said vehicle deceleration exceeds a particular level and a vehicle brake is not being applied, and by a set percentage when said vehicle brake is being applied.

2. A vehicle transmission system, comprising:
    a transmission having a power output shaft;
    a retarder interconnected with said output shaft for selectively applying a braking torque thereto; and
    control means interconnected between said transmission and said retarder for regulating said retarder to control said braking torque, said control means reducing said braking torque by control of said retarder and inhibiting said retarder for increased braking torque during a downshift of said transmission.

3. A vehicle transmission system, comprising:
    a transmission having a power output shaft;
    a retarder having a spring-biased solenoid valve and being interconnected with said output shaft for selectively applying a braking torque thereto; and
    control means interconnected between said transmission and said retarder for regulating said retarder by pulse width modulating said solenoid valve at selected duty cycles, said control means activating said retarder at known transmission speeds at predetermined duty cycles and monitoring resultant vehicle decelerations at such transmission speeds and duty cycles, said control means extrapolating therefrom an adaptive relationship between duty cycle and deceleration by said retarder.

4. The vehicle transmission system according to claim 3, wherein said control means further senses vehicle speed and transmission temperature and regulates said duty cycle as a function thereof.

5. The vehicle transmission system according to claim 4, wherein said control means reduces said duty cycle and suspends any increase in duty cycle during a downshift of said transmission.

* * * * *